Sept. 15, 1936.  J. W. FORREST ET AL  2,054,195
COLOR COMPARATOR
Filed Nov. 2, 1933    2 Sheets-Sheet 2

GUSTAVE FASSIN
JOHN W. FORREST
INVENTORS

Patented Sept. 15, 1936

2,054,195

UNITED STATES PATENT OFFICE 2,054,195

COLOR COMPARATOR

John W. Forrest, Brighton, and Gustave Fassin, Irondequoit, N. Y., assignors to Bausch & Lomb Optical Company, Rochester, N. Y., a corporation of New York Application November 2, 1933, Serial No. 696,338

4 Claims. (Cl. 88—14)

This instrument relates to optical instruments and more particularly it has reference to instruments which are used for comparing the color of a sample with a standard color chart so that the color of the sample may be expressed in terms of the standard color chart.

One of the objects of our invention is to provide an improved color comparator of the type described. Another object is to provide a color comparator having improved optical means for mixing or integrating the various colors of a standard color chart. A further object is to provide a color comparator having improved means for illuminating the sample and the color chart. These and other objects and advantages reside in certain novel features of construction, arrangement and combination of parts as will hereinafter be more fully described and pointed out in the appended claims.

Referring to the drawings.

Figure 1:
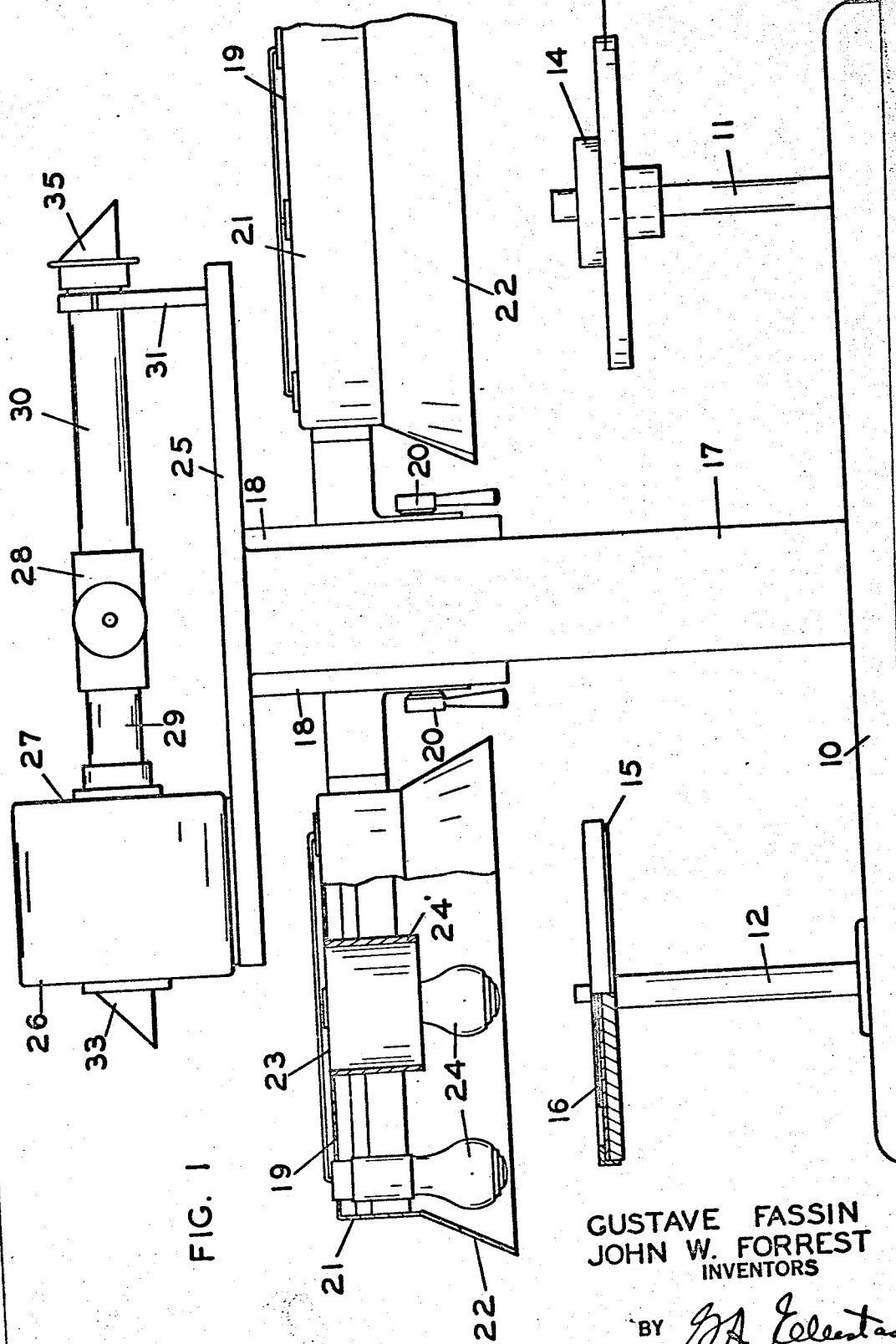
Fig. 1 is a side elevation of a color comparator embodying our invention, with parts in section.

A preferred embodiment of our invention is illustrated in the drawings wherein 10 indicates a base on which are mounted the two rods 11 and 12 carrying, respectively, the table 13 for the sample 14 and the table 15 supporting the color chart 16. Also mounted on base 10 is the pillar 17 having ways 18 on which the two illuminating units 19 are slidably mounted and adapted to be held in adjusted position by means of clamping screws 20. Each of these units comprises a reflector casing 21 having an outwardly inclined portion 22. The top of casing 21 has a centrally disposed opening 23 around which are mounted a plurality of light sources such as the incandescent lamps 24. The inside surfaces of casing 21 are preferably coated with a flat white paint so as to render them diffusely reflecting in character. A centrally disposed tubular light shield 24' extends downwardly from the edge of opening 23.

Figure 2:
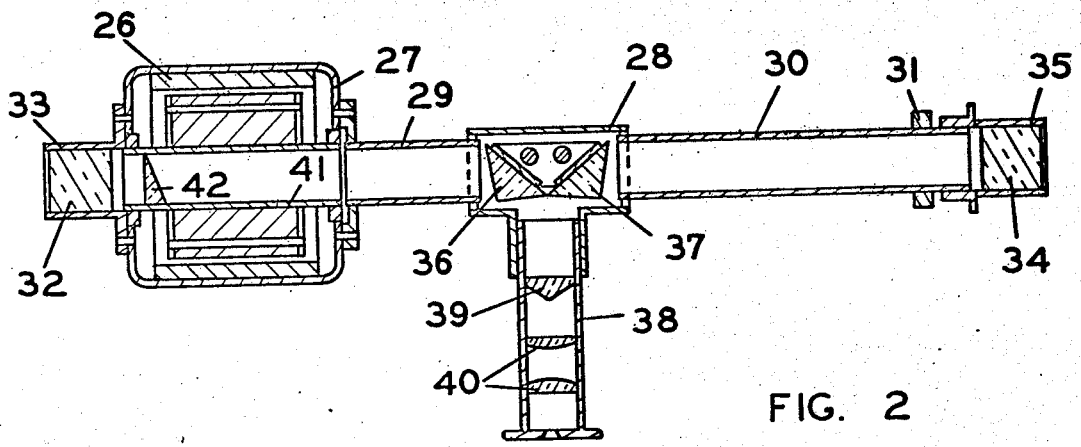
Fig. 2 is a horizontal sectional view through the optical system of the instrument.
Figure 3:
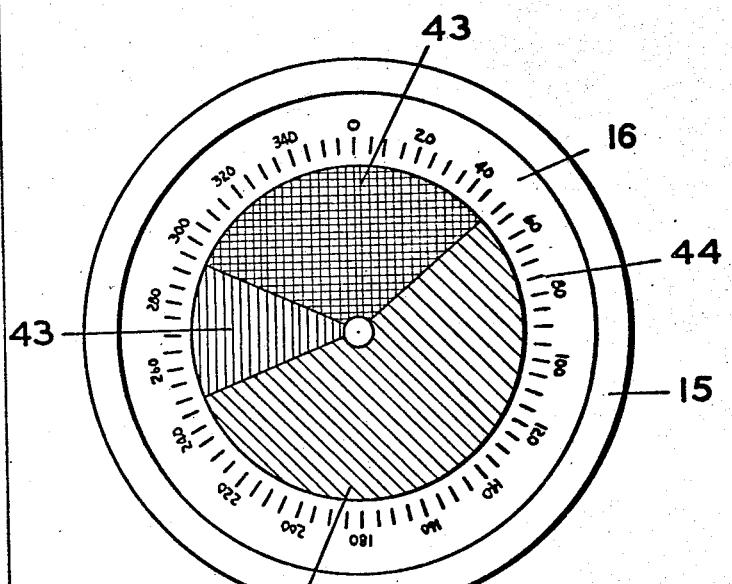
Fig. 3 is a top plan view of the color chart used with the instrument.
Figure 4:
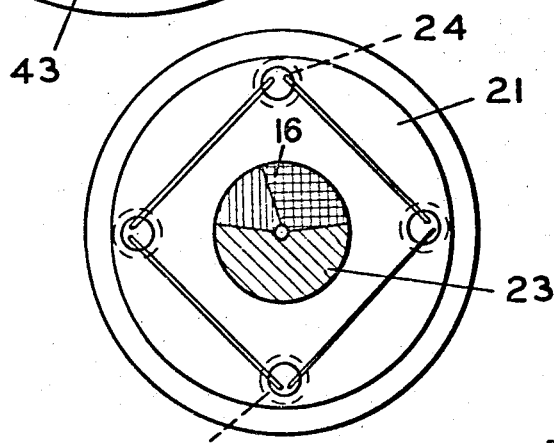
Fig. 4 is a top plan view of one of the illuminating units.

The pillar 17 carries a plate 25 on which is mounted the optical system of the instrument, shown in section in Fig. 2. On one end of plate 25 is mounted the electric motor 26 having the outer casing 27. Extending in opposite directions from the housing 28 are the two tubes 29 and 30 which are fixedly supported, respectively, by the motor casing 27 and the bracket 31. A forty-five degree reflecting prism 32 is carried by a mounting 33 fixedly secured to the motor casing 27 while another similar reflecting prism 34 is carried in a mounting 35 which is rotatably mounted on the free end of tube 30 for a purpose to be hereinafter described. Mounted within the housing 28 are the two prisms 36 and 37 which cooperate, respectively, with the reflectors 32 and 34. Slidably mounted on housing 28 is a tube 38 carrying a biprism 39 and the eyepiece lenses 40. The motor 26, which is preferably of the induction type, has a hollow rotatable shaft 41 within which is fixedly mounted the prism 42. The color chart 16 comprises a plurality of differently colored disks 43 which can be arranged in overlapping relation and adjusted relatively to each other so as to vary the exposed area of each disk.

In operation, the sample 14 is placed on table 13, the illuminating units are rendered operative and the motor 26 is started. Upon looking into the eyepiece two contiguous fields or images will be seen, one formed by the sample and one formed by the color chart. The rotation of prism 42 causes mixing of the colors on each of the disks so that a uniformly colored image appears in one half of the eyepiece field. While the motor is running the operator adjusts the exposed areas of colored disks 43 until the color produced in one half of the field matches the color of the sample which is visible in the other half of the field. A circular scale 44 indicates the amount which each disk is exposed so that the color of the sample can be determined in terms of the standard color units.

From the foregoing, it will be apparent that we are able to attain the objects of our invention by providing an improved device which will be relatively simple in structure yet convenient and efficient in operation. The use of the motor with the hollow shaft provides a compact unit, eliminates the use of gears and belts and affords an instrument which runs smoothly and quietly. The illuminating units provide an even, uniform illumination so that sample and color chart are illuminated substantially the same. The mounting 35 carrying prism 34 is rotatably mounted on tube 30 so that the prism can be turned so as to face a sample which is positioned in a vertical plane at one side of the instrument, thereby making it possible to compare the color of a sample which is too large to be placed on table 13. Various modifications can obviously be made without departing from the spirit of our invention.

We claim:

1. In a color comparator for comparing a sample with a standard, the combination of two spaced reflectors, an eyepiece and prism system positioned between said reflectors in operative relation thereto, for forming images of said sample and said standard in adjacent fields, a rotatable hollow shaft positioned between one of said reflectors and said system, the axis of said shaft being in alinement with the reflector and said system, a prism carried by said shaft, and means for rotating said shaft at a speed sufficient to integrate discrete colors or brilliancies in one of said fields.

2. In a color comparator for comparing a sample with a standard, the combination of two spaced, alined reflectors, an optical system positioned between said reflectors for forming images of said sample and said standard in adjacent fields, said optical system comprising a pair of prisms positioned between said reflectors, an eyepiece and a prism positioned in operative relation to said prisms, a rotatable prism positioned between one of said reflectors and said pair of prisms and means for rotating said rotatable prism at a speed sufficient to integrate discrete colors or brilliancies in one of said fields.

3. A color comparator comprising a base, means for holding a color chart and a sample in spaced relation on said base and means for producing contiguous images of said samples and chart, said last named means comprising an optical system, a motor having a rotatable hollow shaft in alignment with the axis of said system and a prism mounted within said shaft.

4. A color comparator comprising a base, spaced tables on said base for carrying, respectively, a color chart and a sample, an annular shaped illuminating unit positioned above each of said tables, each of said units having a free, central opening, a reflecting device positioned above each of said openings, a pair of prisms mounted between said reflecting devices and in alignment therewith, an eyepiece mounted laterally of said pair of prisms, a motor positioned between one of said reflecting devices and said pair of prisms, said motor having a hollow rotatable shaft in alignment with said device and the pair of prisms and a prism mounted within said shaft.

JOHN W. FORREST.
GUSTAVE FASSIN.